United States Patent [19]
Maddox

[11] 3,815,654
[45] June 11, 1974

[54] TRACTOR TIRE REMOVER MEANS

[76] Inventor: Reuben E. Maddox, Glasgow, Mo. 65254

[22] Filed: Aug. 22, 1972

[21] Appl. No.: 282,846

[52] U.S. Cl. .............................................. 157/1.26
[51] Int. Cl. .............................................. B60c 25/06
[58] Field of Search................ 157/1.26, 1.28, 1.17

[56] References Cited
UNITED STATES PATENTS

| | | | |
|---|---|---|---|
| 2,439,135 | 4/1948 | Johnson et al. | 157/1.28 |
| 2,798,540 | 7/1957 | Branick | 157/1.26 |

*Primary Examiner*—Granville Y. Custer, Jr.
*Assistant Examiner*—Harold P. Smith, Jr.

[57] ABSTRACT

This invention relates to a portable tractor tire remover means which can be readily assembled and disassembled for ease of handling and movement and having power means which may be connected to the conventional power take-off structures on farm work implements such as tractors. More particularly, this invention is a tire remover means operable under fluid power to remove the tire from the rim of a tire structure having actuator arms movable towards each other to release the tire in a most efficient and effective manner and including adjustable means so as to be readily utilized on tires of all sizes.

7 Claims, 8 Drawing Figures

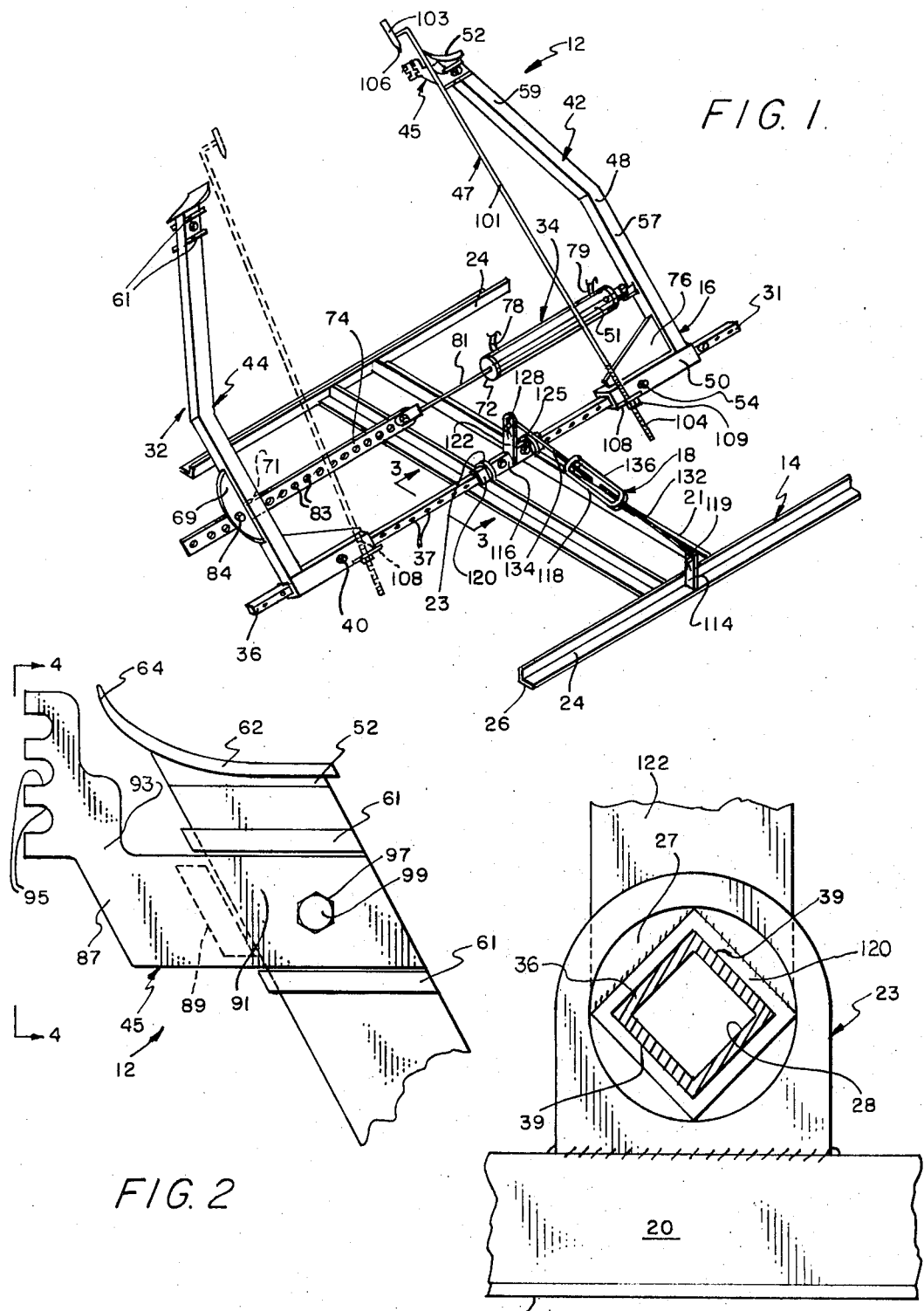

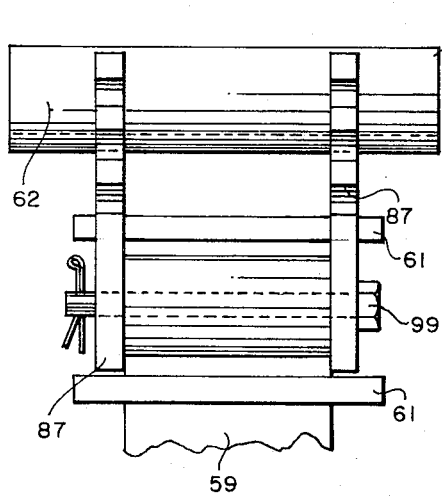
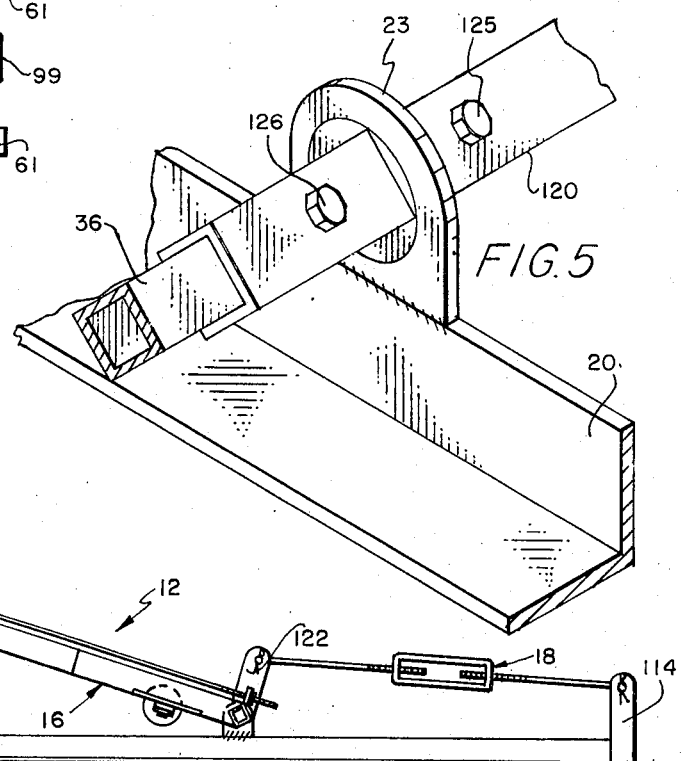
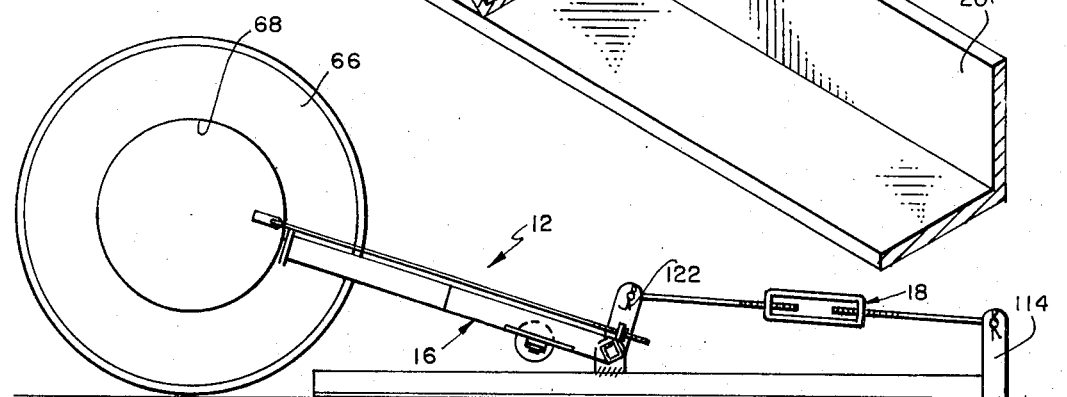
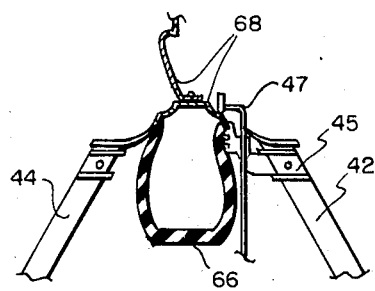
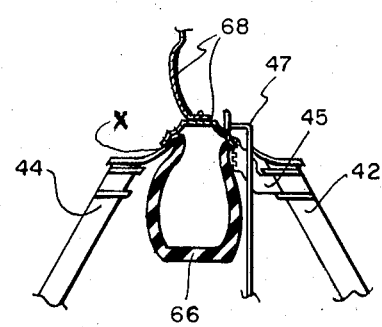

TRACTOR TIRE REMOVER MEANS

Numerous types of tire remover structures are known in the prior art for removing a tire from a wheel structure but they are not portable in usage; and complicated to operate. Also, the prior art tire remover structures require extensive areas of operation and cannot be easily utilized by one person.

In one preferred embodiment of this invention, a portable tire remover means is provided having a basic support means, an actuator means pivotally connected to the basic support means, and a height adjustment means connected to the basic support means and the actuator means to properly position and adjust the height thereof. The basic support means includes a pair of elongated parallel angle iron members having bearing support members connected to a central portion thereof and a pair of parallel end support angle iron members connected to the outer ends of the first angle iron members to provide a horizontal, lower, surface for support. The bearing members are adapted to receive a portion of the actuator means to connect the same thereto and allow rotation thereof. The actuator means includes an actuator support means having an actuator arm means connected thereto. The actuator support means includes a main elongated support member of square shape in transverse cross section adapted to fit within similarly shaped square holes in the bearing members. The support member is provided with a plurality of spaced holes aligned with similar holes on opposed parallel sides thereof to receive bolt members therethrough for anchoring and adjustment purposes. A central portion of the support member is adapted to be placed through a portion of the height adjustment means and anchored thereto by bolt members. The actuator arm means includes a first arm assembly and a second arm assembly mounted on respective opposite ends of the support member; a power means interconnecting the first and second assemblies; a jaw means connectable to either one of the arm assemblies; and a reaction means mounted on a portion of a selected one of the arm assemblies. The first arm assembly includes a main body connected by a gusset plate to a connector member and a break jaw connected to the upper end of the main body. The connector member is of square, tubular shape in transverse cross section adaptable to receive the support member therein with the main body extending perpendicular thereto. The upper portion of the main body is curved inwardly having its outer end formed with the break jaw. The upper end is provided with a pair of spaced guide members to receive the jaw means therewithin. The break jaw is provided with an upper, arcuate plate member to be placed against a tire for removing the same from a rim structure. The second jaw assembly includes the above noted main body, gusset plate, connector member, and breaker jaw plus an anchor plate extended outwardly laterally from the main body for connection to the power means. The jaw means is of an irregular shape having a pair of parallel jaw members interconnected by a support plate. Each jaw member includes a plurality, namely three, simi-circular indentations for grasping the tire rim during usage. The jaw means is adapted to be placed between the guide members on a selective one of the arm assemblies during usage and secured thereto by a nut and bolt member. The reaction mean includes an elongated rod member having a hammer section connected to one end thereof and an anchor section at the opposite end. The upper end of the rod member is bent substantially 90° and connected to the hammer section which extends parallel to the rod member. The anchor section is placed through a tab member secured to the support member and a nut member is threaded on the lower end thereof. The power means includes a piston and cylinder assembly having one end pivotally connected to the main body of the first arm assembly and having a piston rod extended outwardly connected by a connector bar to the main body of the second arm assembly. The connector bar is provided with a plurality spaced holes and a nut and bolt member connects the same as to the anchor plate of the second arm assembly. The height adjustment means includes a turnbuckle assembly mounted between the basic support means and the support member of the actuator means to selectively regulate the height of the first and second arm assemblies.

One object of this invention is to provide a tire removal means having structural features as to be readily assembled and disassembled for transport; can be ported and used by one person; and adatped to be connected to a power source conventionally available from farm implements such as a tractor structure.

One further object of this invention is to provide a tire remover means operable under hydraulic pressure being readily portable and easily adjustable for removing a tire member from a rim structure regardless of the size thereof.

One further object of this invention is to provide a portable tire remover means having a jaw means and a reaction means for connection to a rim portion of a wheel structure and having a break jaw operable under hydraulic pressure for breaking the tire member from the rim portion in an efficient and effective manner.

Still, one further object of this invention is to provide a tire remover mean which can be readily assembled and disassembled by one person and transported in a pick-up truck to any desired location for removing a tire member from a wheel structure for repair and servicing.

Still, one other object of this invention is to provide a tire remover means which is economical to manufacture; simple in operation; powered by the hydraulic pressure available on the structure to be repaired; and safe in operation.

Various other objects, advantages, and features of the invention will become apparent to those skilled in the art from the following discussion, taken in conjunction with the accompanying drawings, in which:

FIG. 1 is a perspective view of a portable tire remover means of this invention;

FIG. 2 is an enlarged fragmentary view of a break jaw and a jaw means of the portable tire remover means of this invention;

FIG. 3 is an enlarged sectional view taken along the line 3—3 in FIG. 1;

FIG. 4 is a fragmentary sectional view taken along line 4—4 of FIG. 2;

FIG. 5 is a perspective view showing the interconnection of a height adjustment means and a support means of the tire remover means of this invention;

FIG. 6 is a side elevational view illustrating the tire remover means of this invention as being utilized on a tire assembly; and FIGS. 7 and 8 are schematic diagrams illustrating the use and operation of the portable tire remover means of this invention on breaking a tire member from a rim structure.

The following is a discussion and description of preferred specific embodiments of the new portable tire remover means of this invention, such being made with reference to the drawings whereupon the same reference numerals are used to indicate the same or similar parts and/or structure. It is to be understood that such discussion and description is not to unduly limit the scope of the invention.

Referring to the drawings in detail and in particular to FIG. 1, a portable tire remover means, indicated at 12, includes a basic support means 14; an actuator means 16 pivotally connected to the basic support means 14; and a height adjustment means 18 connected to the basic support means 14 and the actuator means 16.

The basic support means 14 includes a first pair of parallel angle iron members 20 and 21 having bearing support members 23 and a parallel pair of end support angle iron members 24 secured to the outer ends of the first angle iron members 20 and 21. All of the angle iron members 20, 21 and 24 are welded with the closed faces open outwardly and the lower surfaces, indicated at 26, lie on a common horizontal plane to provide the necessary support. The bearing support members 23 include a main body secured as by welding to a central portion of respective ones of the angle arm members 20 and 21 and having a rotatable bearing 27 therein. A central portion of each bearing 27 is provided with a square opening 28 to receive the actuator means 16 therethrough.

The actuator means 16 includes an actuator support means 31; an actuator arm means 32; and a power means 34 connected to the actuator arm means 32. The actuator support mean 31 includes a main elongate support member 36 of square shape in transverse cross section. The support member 36 has a plurality of equally, spaced holes 37 on opposed sidewalls 39 with aligned pairs of the holes 37 to receive nut and bolt members 40 therethrough for anchoring and adjustment purposes. The support member 36 is adapted to be placed through the openings 39 in the bearings 27 the basic support mean 14 to provide support and permit rotation as will be explained.

The actuator arm means 32 includes a first arm assembly 42 and a second arm assembly 44, both adjustably mountable on the support member 36; a jaw means 45 releasably mountable on respective ones of the first and second arm assemblies 42 and 44; and a reaction means 47 selectively connectable to respective ones of the arm assemblies 42 and 44.

The first arm assembly 42 includes a main body 48 having a connector member 50 secured at one end through a gusset plate 76 and a break jaw 52 at the opposite end thereof. The connector member 50 is of square shape in transverse cross section and of a size to snugly fit about the support member 36 for axially movement thereon. The connector member 50 is provided with a pair of aligned holes 54 on opposite sides thereof to be aligned with selective holes 37 in the support member 36 and connected thereto by the nut and bolt member 40 in the locked condition. The gusset plate 76 is of a triangular shape to provide support between the connector member 50 and the main body 48.

The main body 48 is of a square shape in transverse cross section having a first section 57 extended 90° upwardly from the connector member 50 and an upper section 59 angled inwardly therefrom. The break jaw 52 is formed at the end of the upper section 59 having a pair of parallel, guide bars 61 on opposite parallel sides of the main body 48 to receive the jaw means 45 thereon. The break jaw 52 further includes an arcuate plate member 62 having an outer pointed portion 64 to be received against the bead on a tire member 66 for removing from a rim structure 68 as will be explained.

The second arm assembly 44 is substantially identical to the first arm assembly 42 having the main body 48 interconnected by the gusset plate 76 to the connector member 50 and the break jaw 52 at the upper portion of the main body 48. The difference is in that the second arm assembly 44 includes a curved anchor plate 69 secured to an outer surface of the main body 48 and provided with a slot 71 to receive a portion of the power means 34.

The power means 34 includes a piston and cylinder assembly 72 connected at one end to the first arm assembly 42 and at the other end to a connector bar 74 mounted through the slot 71 in the second arm assembly 44. The piston and cylinder assembly 72 includes a main cylinder 51 having fluid lines 78 and 79 connected thereto and a piston rod member 81 secured to the connector bar 74. The connector bar 74 is of rectangular shape in transverse cross section having a plurality of spaced holes 83 for anchoring in the desired position by a nut and bolt member 84 extended through a hole in the anchor plate 69.

As shown in FIG. 2, the jaw means 45 includes a pair of parallel jaw members 87 interconnected by a support plate 89. The jaw members 87 are of an irregular shape having a body section 91 integral with an outwardly extended jaw section 93. The jaw section 93 is provided with a plurality of spaced, semi-circular slots 95 adapted to grasp the tire rim structure 68 as will be explained. The support plate 89 is to place the jaw means 45 in the proper position during usage and the body section 91 is provided with aligned holes 97 to receive a nut and bolt member 99 extended through the respective ones of the first and second arm assemblies 42 and 44.

The reaction means 47 includes an elongated rod member 101 having a hammer head section 103 at one end and an anchor section 104 at the other end. The rod member 101 is provided at the upper end with a section bent at 90° which is connected as by welding to the hammer head section 103. The hammer head section 103 includes a pointed portion 106 so as to resemble a pencil member and extends parallel to the axis of the rod member 101. The anchor section 104 includes a plate member 108 which is welded to an outer surface of each of the connector members 50 of the first and second arm assemblies 42 and 44 and the lower end of the rod member 101 is threaded to receive a nut member 109 thereon. The plate member 108 has a hole to receive the rod member 101 therethrough.

The height adjustment means 18 includes a support lug 114 secured to the basic support means 14; a connector assembly 116 connected to the support member 36 of the actuator means 16; and a turnbuckle assembly 118 connected to the support lug 114 and the connector assembly 116. The support lug 114 extends upwardly from one of the end support angle iron members 24 and includes a hole 119 in the upper end to receive a portion of the turnbuckle assembly 118.

The upright connector assembly 116 includes a tube member 120 having a turn lug 122 secured thereto. The tube member 120 is square of shape in transverse cross section operable to receive the support member 36 of the actuator means 16 snugly therewithin and being of a length substantially equal to the separation of the bearing support members 23 of the basic support means 14. The tube member 120 is provided with openings 125 on opposite sides to receive nut and bolt members 126 therethrough to secure to the support member 36. It is noted that this construction permits disassembly for ease of conveyance. The turn lug 122 extends upwardly and has a hole 128 in the upper end to receive a portion of the turnbuckle assembly 118.

The turnbuckle assembly 118 includes first and second rods 132 and 134 connected to respective ones of the support lug 114 and the turn lug 122 and interconnected at inner adjacent ends with a turnbuckle member 136. The rods 132 and 134 are threaded and received in the turnbuckle member 136 whereby the rotation of the turnbuckle member 136 operates in a conventional manner to increase or decrease the overall length of the turnbuckle assembly 118. It is obvious that an increase or decrease in length of turnbuckle assembly 118 would cause the support member 36 to rotate varying the vertical position of the outer ends of the first and second arm assemblies 42 and 44.

In the use and operation of the portable tire remover means 12 of this invention, we shall assume the assembled condition as shown in FIG. 1 with the reaction means 47 and the jaw means 45 mounted thereon. As shown in FIG. 6, the assembled tire member 66 and rim structure 68 can be rolled to the tire remover means 12. Next, the height adjustment means 18 through the turnbuckle assembly 118 can be adjusted as to place the first arm assembly 42 and second arm assembly 44 substantially axially aligned with the center of the wheel and tire assembly.

As shown in FIG. 7, the jaw means 45 is thereupon locked to the respective first arm assembly 42 by the nut and bolt member 99 and the jaw members 87 are moved therewithin so that the rim structure is placed within one of the semi circular slots 95. Next, the reaction means 47 is brought into position to provide a downward force against an inner surface of the rim structure 68 to provide the required stability. The nut member 109 is threaded on the lower end of the rod member 101 into firm contact against the plate member 108 whereupon rotation of the nut member 109 causes downward movement of the rod member 101 to place the hammer head section 103 in firm engagement with the rim structure 68.

Next, it is noted that the second arm assembly 44 can be moved on the support member 36 and the connector bar 74 to the desired location whereupon the nut and bolt member 84 is placed through one of the holes 83 and a hole in the anchor plate 69. The bolt 40 in the connector member 50 of the second arm assembly 44 is removed whereby the second arm assembly 44 is free to move axially on the support member 36.

Next, as shown in FIG. 8, the power means 34 is operated on forcing fluid pressure from a vehicle power source through the inlet line 78 to move the connector bar 74 inwardly to break the tire bead as illustrated by the separation "X." It is noted that a bolt member may be placed within the support member 36 and/or the connector bar 74 at various locations to limit movement of the piston and cylinder assembly 72 to prevent damage and as a safety feature during usage.

It is noted that the tire remover means can be operated from a separate pump and motor assembly on air pressure found in service stations and tire repair trucks or, more conveniently, on the available fluid supply means normally found in tractor structures and other such farm machinery.

After usage, it is noted that the first arm assembly 42 and the second arm assembly 44 can be readily moved axially on the support member 36 for disassembly and ease of storage and portability.

Also, as required, the nut and bolt members 126 can be removed from the interconnection of the connector tube 120 and the support member 36 so that the eleongated support member 36 can be removed from the bearing support members 23 for ease of transporting.

It is noted that the portable tire remover means of this invention presents a structure that is economical to manufacture; simple in usage; provided with numerous features of adjustability and safety features; and readily usable in remote locations relying on the power supply from the disabled vehicle in the area.

The following invention has been described in conjunction with preferred specific embodiments thereof, and it is to be understood that this description is tended to illustrate and not to limit the scope of the invention, which is defined by the following claims;

I claim:

1. A portable tire remover means adapted to be carried to the disabled vehicle and utilize the power source available from the subject vehicle to remove a tire member from a rim structure, comprising:
   a. a basic support means supported on a support surface,
   b. an actuator means connected to said basic support means including a first arm assembly and a second arm assembly interconnected by a power means for movement relative each other to contact the tire member and the rim structure, and a jaw means selectively mounted on said first and second arm assemblies,
   c. said jaw means to contact said rim structure on one of said first and second arm assemblies and the other one of said first and second arm assemblies moved on operation of said power means to contact the tire member and break contact of same with the rim structure.

2. A portable tire remover means, as described in claim 1, comprising:
   a. said actuator means having an elongated support member connected to said support means and said first and second arm assemblies are each slidably and adjustably mounted on said support means through a connector member, and
   b. said connector member mounted on a selected respective one of said first and second arm assemblies and connected to said support member to anchor a selected one of said first and second arm assemblies in a fixed condition, whereby one of said first and second arm assemblies acts as a stationary unit with said jaw means thereon and the other unit is moved by said power means.

3. A portable tire remover means, as described in claim 2, comprising:
a. said power means having a piston and cylinder assembly connected to said first arm assembly and a connector bar releasably connected to said second arm assembly, and
b. said piston and cylinder assembly connectable to the power source of the desired vehicle for operation to move a selected one of said first and second arm assemblies.

4. A portable tire remover means as described in claim 1, wherein:
a. said jaw means having a pair of parallel jaw plates interconnected by a support bar and releasably connected to one of said first and second arm assemblies, and
b. said jaw plates having a plurality of semi-circular slots engageable with various sizes of the rim strcture to hold same while removing the subject tire member therefrom.

5. A portable tire remover means as described in claim 1, including:
a. said actuator means including a reaction means having a hammer head section engageable with said rim structure to hold same in cooperation with said jaw means for removing the tire member.

6. A portable tire remover as described in claim 1, including:
a. a height adjustment means connected to said support means and said actuator means operable to vary the vertical heights of said first and second arm assemblies for use on tire structures of various sizes.

7. A portable tire remover means as described in claim 6, wherein:
a. said actuator means having an elongated support member rotatably mounted in bearing members being part of said support means,
b. said height adjustment means having a turnbuckle assembly connected to a connector tube,
c. said connector tube mounted about and releasably connected to said support means for ease of disassembly,
d. said turnbuckle assembly operable to rotate said connector tube and said support member, and
e. said first and second arm assemblies mounted on said support members and adjusted in height on rotation of said support member on operation of said height adjustment means.

* * * * *